United States Patent
Ogawa et al.

(10) Patent No.: US 9,941,530 B2
(45) Date of Patent: Apr. 10, 2018

(54) FUEL CELL SYSTEM INCLUDING WATER CONTENT ESTIMATION

(71) Applicant: TOYOTA JIDOSHA KABUSHIKI KAISHA, Toyota-shi, Aichi-ken (JP)

(72) Inventors: Tomohiro Ogawa, Toyota (JP); Tsuyoshi Maruo, Toyohashi (JP); Masashi Toida, Nagoya (JP); Yoshiaki Naganuma, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 39 days.

(21) Appl. No.: 15/180,436

(22) Filed: Jun. 13, 2016

(65) Prior Publication Data

US 2016/0380289 A1 Dec. 29, 2016

(30) Foreign Application Priority Data

Jun. 23, 2015 (JP) .................................. 2015-125681

(51) Int. Cl.
*H01M 8/04* (2016.01)
*H01M 8/04492* (2016.01)
(Continued)

(52) U.S. Cl.
CPC ... *H01M 8/04529* (2013.01); *H01M 8/04291* (2013.01); *H01M 8/04358* (2013.01);
(Continued)

(58) Field of Classification Search
CPC ......... H01M 8/04828; H01M 8/04126; H01M 8/04492; H01M 8/04291
See application file for complete search history.

(56) References Cited

U.S. PATENT DOCUMENTS

2010/0068574 A1* 3/2010 Naganuma ........ H01M 8/04089
429/423
2010/0291446 A1* 11/2010 Aso ..................... B60L 11/1887
429/429
(Continued)

FOREIGN PATENT DOCUMENTS

JP 2007-294166 A 11/2007
JP 2010-165463 7/2010
(Continued)

*Primary Examiner* — Imran Akram
(74) *Attorney, Agent, or Firm* — Finnegan, Henderson, Farabow, Garrett & Dunner, LLP (57) ABSTRACT

An object is to provide a technique of enhancing the accuracy of estimation of the water content of a fuel cell on the occurrence of localized drying of an electrolyte membrane. In a fuel cell system, until satisfaction of a second condition indicating that localized drying of the electrolyte membrane is eliminated after satisfaction of a first condition indicating that localized drying of the electrolyte membrane occurs, a water content estimator performs a second water content estimation process that estimates the water content of the fuel cell based on an output current value of the fuel cell, in place of a first water content estimation process that estimates the water content of the fuel cell based on an impedance of the fuel cell. The first condition is that an oxidizing gas stoichiometric ratio is equal to or higher than a predetermined reference value and that a first elapsed time has elapsed since the oxidizing gas stoichiometric ratio becomes equal to or higher than the predetermined reference value. The second condition is that an accumulated current value by accumulation of the output current value for a second elapsed time since satisfaction of the first condition is equal to or greater than a reference value of accumulated current value or that the oxidizing gas stoichiometric ratio is lower than the predetermined reference value and that a third elapsed time has elapsed since the oxidizing gas stoichio- (Continued)

metric ratio becomes lower than the predetermined reference value.

2 Claims, 6 Drawing Sheets

(51) Int. Cl.
H01M 8/04291 (2016.01)
H01M 8/0432 (2016.01)
H01M 8/04537 (2016.01)
H01M 8/04746 (2016.01)
H01M 8/1018 (2016.01)

(52) U.S. Cl.
CPC ... *H01M 8/04589* (2013.01); *H01M 8/04649* (2013.01); *H01M 8/04753* (2013.01); *H01M 2008/1095* (2013.01)

(56) References Cited

U.S. PATENT DOCUMENTS

| 2011/0269046 | A1 | 11/2011 | Suematsu | |
| 2011/0293972 | A1* | 12/2011 | Naganuma | B60L 11/1887 429/9 |
| 2012/0015263 | A1 | 1/2012 | Suematsu et al. | |
| 2012/0058404 | A1 | 3/2012 | Ishikawa et al. | |
| 2014/0162151 | A1* | 6/2014 | Mohri | H01M 8/04835 429/413 |
| 2014/0295302 | A1* | 10/2014 | Ishikawa | H01M 8/04119 429/413 |

FOREIGN PATENT DOCUMENTS

WO WO 2010/131351 A1 11/2010
WO WO 2011/061817 A1 5/2011

\* cited by examiner

FUEL CELL SYSTEM INCLUDING WATER CONTENT ESTIMATION

CROSS-REFERENCE TO RELATED APPLICATIONS

The present application claims priority to Japanese patent application P2015-125681 filed on Jun. 23, 2015, the content of which is hereby incorporated by reference into this application.

BACKGROUND

Field

The present invention relates to a fuel cell system.

Related Art

In a polymer electrolyte fuel cell (hereinafter simply referred to as "fuel cell"), an excessively high water content of the fuel cell (an excessively large amount of liquid water in the fuel cell) causes a reactive gas flow path to be blocked, thus decreasing the output power. An excessively low water content of the fuel cell, on the other hand, causes an electrolyte membrane to be dried and thereby reduces the proton conductivity in the electrolyte membrane, thus decreasing the output power. It is accordingly desired to adequately control the water content of the fuel cell, in order to maintain the output power of the fuel cell appropriately. A proposed technique estimates the water content of the fuel cell, based on a relationship of impedance of the fuel cell to water content of the fuel cell (JP 2010-165463A).

The technique of estimating the water content of the fuel cell based on the impedance of the fuel cell described in JP 2010-165463A is, however, likely to provide an error in the estimated value of the water content on the occurrence of localized drying of the electrolyte membrane. There is accordingly a need for a technique that enhances the accuracy of estimation of the water content of the fuel cell on the occurrence of localized drying of the electrolyte membrane.

SUMMARY

In order to solve at least part of the above problems, the invention may be implemented by any of the following aspects.

(1) According to one aspect of the invention, there is provided a fuel cell system. This fuel cell system comprises a fuel cell configured to include an electrolyte membrane; and a water content estimator configured to perform a first water content estimation process that estimates a water content of the fuel cell, based on a differential impedance as a difference between a low frequency impedance and a high frequency impedance of the fuel cell or based on the high frequency impedance. Until satisfaction of a second condition indicating that localized drying of the electrolyte membrane is eliminated after satisfaction of a first condition indicating that localized drying of the electrolyte membrane occurs, the water content estimator performs a second water content estimation process that estimates the water content of the fuel cell based on an output current value of the fuel cell, in place of the first water content estimation process. The first condition is that an oxidizing gas stoichiometric ratio as a ratio of an actual supply amount of an oxidizing gas to a theoretically required supply amount of the oxidizing gas in the fuel cell system is equal to or higher than an oxidizing gas stoichiometric ratio reference value that is greater than an oxidizing gas stoichiometric ratio during ordinary operation of the fuel cell system, and that a first elapsed time has elapsed since the oxidizing gas stoichiometric ratio becomes equal to or higher than the oxidizing gas stoichiometric ratio reference value. The second condition is that an accumulated current value by accumulation of the output current value of the fuel cell for a second elapsed time since satisfaction of the first condition is equal to or greater than a reference value of accumulated current value or that the oxidizing gas stoichiometric ratio is lower than the oxidizing gas stoichiometric ratio reference value and that a third elapsed time has elapsed since the oxidizing gas stoichiometric ratio becomes lower than the oxidizing gas stoichiometric ratio reference value.

The first condition indicating that localized drying of the electrolyte membrane occurs means a condition that there is a high possibility that localized drying of the electrolyte membrane occurs. Satisfaction of the first condition does not necessarily mean that localized drying of the electrolyte membrane actually occurs. The second condition indicating that localized drying of the electrolyte membrane is eliminated means a condition that there is a high possibility that localized drying of the electrolyte membrane is eliminated. Satisfaction of the second condition does not necessarily mean that localized drying of the electrolyte membrane is actually eliminated.

The water content estimation process based on the output current value enables the water content of the fuel cell to be estimated with high accuracy even on the occurrence of localized drying of the electrolyte membrane. The fuel cell system of this aspect performs the water content estimation process based on the output current value when there is a high possibility that localized drying of the electrolyte membrane occurs. This enhances the accuracy of estimation of the water content.

(2) In the fuel cell system of the above aspect, the oxidizing gas stoichiometric ratio reference value may be changed according to temperature of the fuel cell. This configuration changes the oxidizing gas stoichiometric ratio reference value according to the likelihood of drying of the electrolyte membrane, thus further enhancing the accuracy of estimation of the water content.

The invention may be implemented by any of various aspects, for example, a method of estimating the water content of a fuel cell, a moving body with the fuel cell system mounted thereon, a control method of the fuel cell system, a computer program that is configured to implement the functions of any of the method, the system, the moving body and the control method, and a non-transitory storage medium in which the computer program is stored.

DESCRIPTION OF EMBODIMENTS

A. First Embodiment

A1. Configuration of Fuel Cell System

Figure 1:
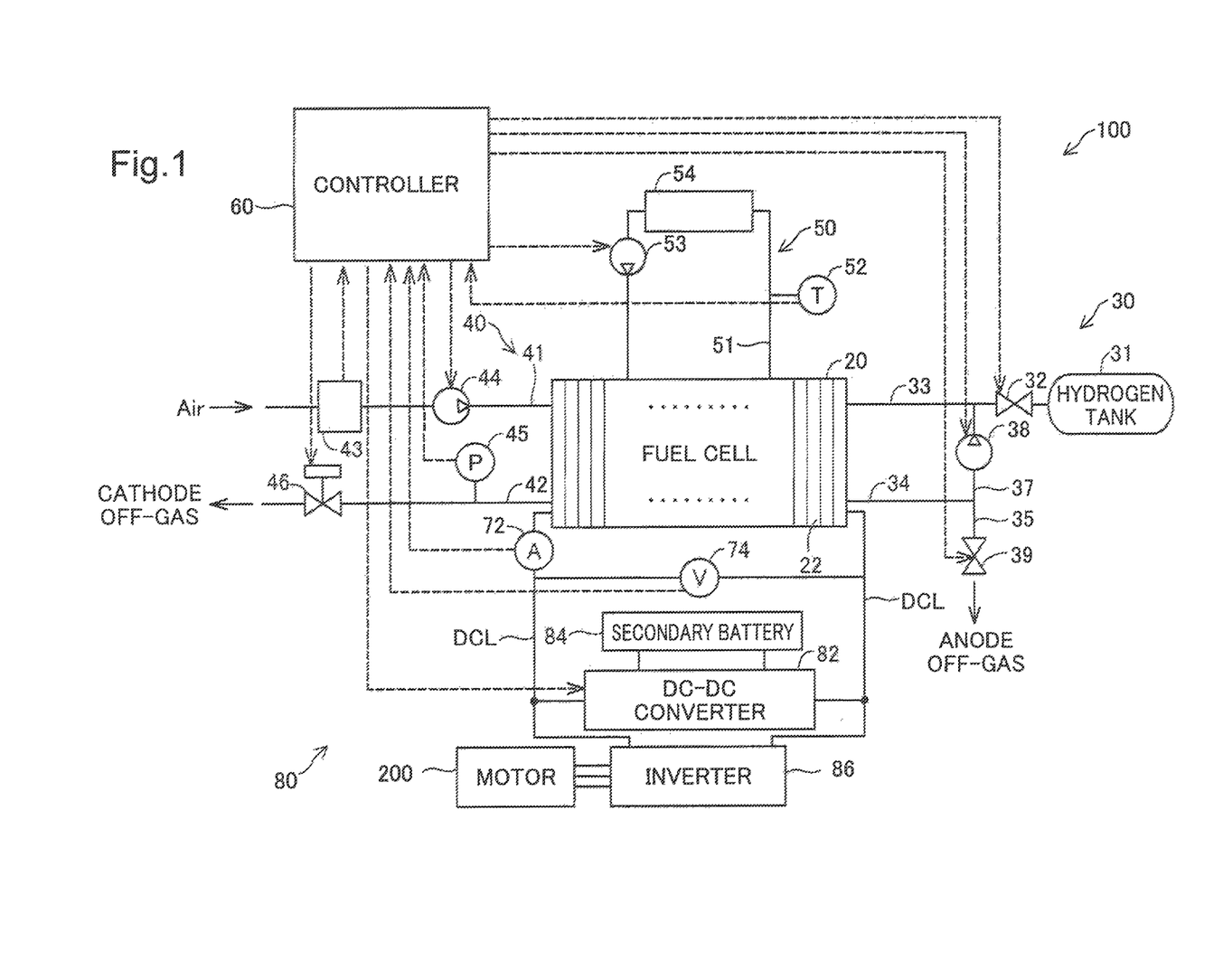
FIG. 1 is a diagram illustrating the schematic configuration of a fuel cell system according to an embodiment of the invention.

FIG. 1 is a diagram illustrating the schematic configuration of a fuel cell system 100 according to an embodiment of the invention. According to this embodiment, the fuel cell system 100 is mounted on a vehicle. The fuel cell system 100 of the embodiment mainly includes a fuel cell 20, a hydrogen supply discharge system 30 that is configured to supply and discharge hydrogen as a fuel gas, an air supply discharge system 40 that is configured to supply and discharge the air as an oxidizing gas, a cooling system 50 that is configured to cool down the fuel cell 20, a controller 60 that is configured to control the fuel cell system 100, and an electric power system 80 that is configured to charge and discharge electric power of the fuel cell system 100.

The fuel cell 20 is a polymer electrolyte fuel cell that is relatively small-sized and has excellent power generation efficiency. The fuel cell 20 generates an electromotive force by electrochemical reactions of pure hydrogen as the fuel with oxygen included in the air as the oxidizing gas at respective electrodes. The fuel cell 20 has a stacked structure by stacking a plurality of unit cells 22. The number of stacked unit cells 22 may be set arbitrarily according to a required output for the fuel cell 20. Each unit cell 22 includes a membrane electrode assembly (not shown) obtained by placing electrode catalyst layers on respective surfaces of an electrolyte membrane, two separators (not shown) arranged across the membrane electrode assembly placed therebetween and gas diffusion layers placed between the membrane electrode assembly and the respective separators.

The electrolyte membrane is a solid polymer membrane that provides good proton conductivity in the wet state that the electrolyte membrane contains water inside. For example, a sulfonic acid group-containing fluororesin-based ion exchange membrane such as Flemion (registered trademark) or Aciplex (registered trademark) may be used for the electrolyte membrane. The electrolyte membrane is, however, not limited to the sulfonic acid group-containing membrane but may be a membrane containing another ion exchange group such as phosphoric acid group or carboxylic acid group.

The electrode catalyst layer is comprised of conductive particles with a catalyst supported thereon and an ionomer as a proton conductive body. The catalyst used may be, for example, platinum or an alloy of platinum and another metal such as ruthenium or iron. The conductive particles used may be, for example, carbon particles such as carbon black, or carbon fibers. The ionomer used may be a sulfonic acid group-containing fluororesin. The ionomer serves to bind the conductive particles with the catalyst supported thereon.

The gas diffusion layer is formed from a porous member that is configured to diffuse the reactive gas and discharge water produced by, for example, the electrochemical reaction. The gas diffusion layer may be made of, for example, a carbon porous body such as carbon paper or carbon cloth or a metal porous body such as metal mesh or metal foam. According to a modification, the gas diffusion layers may be omitted from the configuration of the unit cell 22.

The separator may be formed from a gas-impermeable conductive member, such as dense carbon that is produced by compacting carbon to be gas impermeable or a press-formed metal plate. The separator has flow paths which the reactive gases and cooling water flow through.

The hydrogen supply discharge system 30 mainly includes a hydrogen tank 31, an injector 32, a pipe 33 that is arranged to supply hydrogen to the fuel cell 20, a pipe 34 that is arranged to flow an off gas, a pipe 37 that is arranged to circulate hydrogen included in the off gas, a hydrogen pump 38, a pipe 35 that is arranged to discharge the off gas, and a shutoff valve 39. Hydrogen released from the hydrogen tank 31 configured to store high-pressure hydrogen has a flow rate controlled by the injector 32 and is supplied through the pipe 33 to the anodes of the fuel cell 20. An anode off-gas is introduced into the pipe 34, is subjected to separation of water content by a gas liquid separator (not shown) and is then returned through the pipe 37 to the pipe 33. The water content in the anode off-gas separated by the gas liquid separator is discharged through the pipe 35 to the atmosphere. The shutoff valve 39 is provided on the pipe 35. The water content in the anode off-gas is discharged in the state that the shutoff valve 39 is opened. The hydrogen pump 38 is provided on the pipe 37 to regulate the flow rate of circulation of hydrogen included in the anode off-gas.

The air supply discharge system 40 mainly includes a pipe 41 that is arranged to supply the air, an air flowmeter 43, an air compressor 44, a pipe 42 that is arranged to discharge an off gas, a pressure gauge 45, and a pressure regulator 46. The compressed air that is compressed by the air compressor 44 is supplied through the pipe 41 to the cathodes of the fuel cell 20. A cathode off-gas is discharged through the pipe 42 to the atmosphere. The air flowmeter 43 is provided upstream of the air compressor 44 on the pipe 41 to measure the amount of the outside air that is to be taken in by the air compressor 44. The supply amount of the air by the air compressor 44 is controlled, based on the measured value by the air flowmeter 43. The pressure gauge 45 and the pressure regulator 46 are provided on the pipe 42 to adjust the opening of the pressure regulator 46, based on the measured pressure of the cathode off-gas by the pressure gauge 45. The measured amount of the air by the air flowmeter 43 and the measured pressure of the cathode off-gas by the pressure gauge 45 are sent to the controller 60 to be used for estimation of the water content in the fuel cell 20 described later.

The cooling system 50 mainly includes a pipe 51 that is arranged to circulate cooling water, a temperature sensor 52, a cooling water pump 53, and a radiator 54. Cooling water is circulated by the cooling water pump 53 through a flow path that is defined by the pipe 51 and the fuel cell 20. More specifically, the cooling water flows in the fuel cell 20 to cool down the fuel cell 20, is subsequently cooled down by the radiator 54 and is supplied again to the fuel cell 20. The flow rate of circulation by the cooling water pump 53 is controlled, based on the measured cooling water temperature by the temperature sensor 52. This regulates the operation temperature of the fuel cell 20. The measured temperature by the temperature sensor 52 is sent to the controller 60 to be used for estimation of the water content in the fuel cell 20 described later.

The electric power system 80 includes a DC-DC converter 82, a secondary battery 84 and an inverter 86. The fuel cell 20 is connected with the inverter 86 via a DC line DCL. The inverter 86 is connected with a motor 200 that is a driving power source of the fuel cell vehicle. The secondary battery 84 is connected with the DC line DCL via the DC-DC converter 82.

The secondary battery 84 serves as an auxiliary power supply of the fuel cell 20 and may be implemented by, for example, a chargeable and dischargeable lithium ion battery. The controller 60 controls the DC-DC converter 82 to control the electric current and the voltage of the fuel cell 20 and to control charging and discharging of the secondary battery 84 and thereby variably adjust the voltage level of the DC line DCL.

The inverter 86 serves to convert a DC power input from the fuel cell 20 and the secondary battery 84 into an AC power and supply the converted AC power to the motor 200. In the case where a regenerative power is generated in the motor 200, the regenerative power is converted into a DC power by the inverter 86 and is charged into the secondary battery 84 via the DC-DC converter 82.

The fuel cell system 100 also includes a current sensor 72 that is configured to detect an output current of the fuel cell 20, and a voltage sensor 74 that is configured to detect an output voltage of the fuel cell 20. The detection values of the current sensor 72 and the voltage sensor 74 are sent to the controller 60 to be used for estimation of the water content in the fuel cell 20 described later.

The controller 60 is implemented by a microcomputer that includes a central processing unit and a main storage unit. The controller 60 determines a target output voltage corresponding to the depression amount of an accelerator pedal (not shown), based on a detection value obtained from an accelerator pedal sensor (not shown) and controls the respective components of the fuel cell system 100 described above according to the target output voltage to cause the fuel cell 20 to generate electric power.

As described in detail later, the controller 60 estimates the water content of the fuel cell 20 and adequately controls the water content of the fuel cell 20, based on the estimated value of water content.

Figure 2:
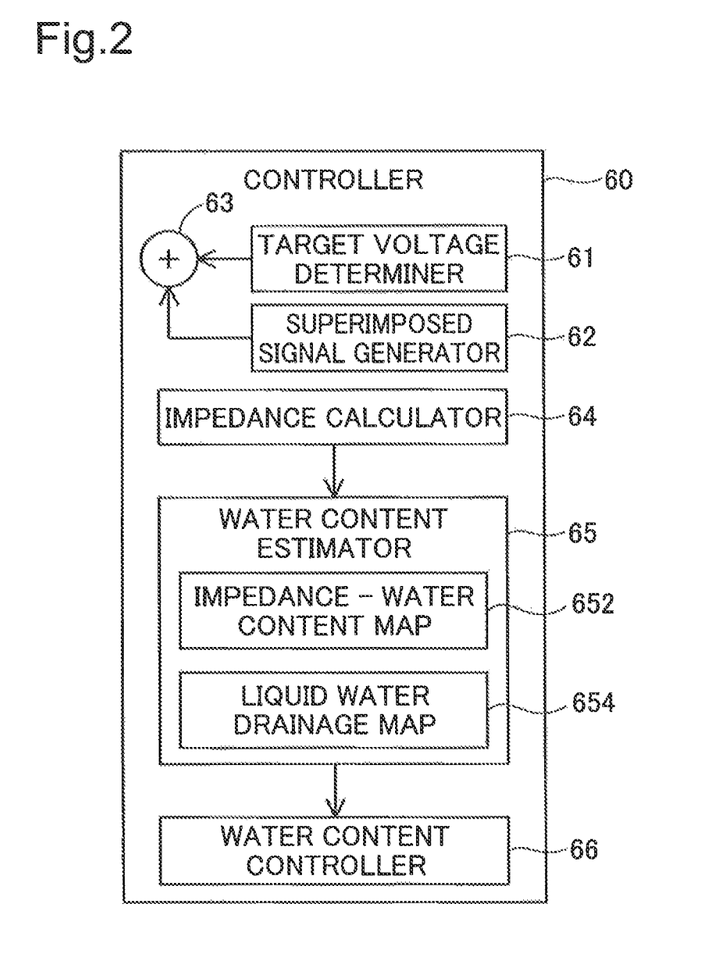
FIG. 2 is a block diagram illustrating the functional configuration of a controller.

FIG. 2 is a block diagram illustrating the functional configuration of the controller 60. The controller 60 includes a target voltage determiner 61, a superimposed signal generator 62, a voltage command signal generator 63, an impedance calculator 64, a water content estimator 65 and a water content controller 66.

The target voltage determiner 61 determines a target output voltage (for example, 300 V) based on various sensor signals input from, for example, the accelerator pedal sensor (not shown), and outputs a target output voltage signal corresponding to the determined target output voltage to the voltage command signal generator 63.

The superimposed signal generator 62 generates an impedance measurement signal (for example, sine wave signals of specific frequencies having the amplitude of 2 V) that is to be superimposed on the target output voltage signal, and outputs the generated impedance measurement signal to the voltage command signal generator 63. This impedance measurement signal includes two different types of sine wave signals of a low frequency and a high frequency. The low frequency may be a frequency domain of, for example, about 100 Hz (hereinafter referred to as "low frequency domain"), and the high frequency may be a frequency domain of, for example, about 1 KHz (hereinafter referred to as "high frequency domain"). The respective parameters (waveform, frequency and amplitude) of the target output voltage signal and the impedance measurement signal may be set appropriately according to, for example, the system design.

The voltage command signal generator 63 superimposes the impedance measurement signal on the target output voltage signal and outputs the superimposed signal as a voltage command signal to the DC-DC converter 82. More specifically, the low frequency signal and the high frequency signal of the impedance measurement signal are sequentially superimposed on the target output voltage signal. The DC-DC converter 82 controls the voltage of the fuel cell 20, in response to the input voltage command signal.

The impedance calculator 64 samples the values of output voltage of the fuel cell 20 detected by the voltage sensor 74 and the values of output current of the fuel cell 20 detected by the current sensor 72 at predetermined sampling rates and processes the sampled values by Fourier transform or the like (for example, FFT operation or DFT operation). The impedance calculator 64 calculates an impedance of the fuel cell 20 by, for example, dividing an output voltage signal after Fourier transform by an output current signal after Fourier transform, and extracts a high frequency impedance and a low frequency impedance from the calculated impedance. The impedance calculator 64 subtracts the high frequency impedance from the low frequency impedance to calculate a differential impedance. The impedance calculator 64 outputs the calculated differential impedance to the water content controller 66.

The water content estimator 65 includes an impedance-water content map 652 and a liquid water drainage map 654. The water content estimator 65 changes over a process of estimating the water content in the fuel cell 20 (estimation method), based on the occurrence or non-occurrence of localized drying of the electrolyte membrane. More specifically, when it is determined that there is a high possibility that localized drying of the electrolyte membrane occurs, the water content estimator 65 provides an estimated value of water content of the fuel cell 20, based on the output current value of the fuel cell 20. Otherwise, the water content estimator 65 provides an estimated value of water content of the fuel cell 20, based on the impedance of the fuel cell 20. Estimation of the water content by the water content estimator 65 will be described later in detail.

The water content controller 66 performs a water content recovery process to increase the water content of the fuel cell 20, when the water content of the fuel cell 20 estimated by the water content estimator 65 is less than a predetermined reference value. The predetermined reference value may be, for examples, a water content set to prevent the catalyst layers and the electrolyte membrane from being dried.

The water content recovery process may be, for example, any of processes given below:

1) an air stoichiometric ratio decreasing process of decreasing the flow rate of the air compressor 44 so as to decrease an air stoichiometric ratio. The air stoichiometric ratio herein denotes a ratio of the actual amount of the air to a theoretical value of the required amount of the air corresponding to the target output voltage of the fuel cell;

2) an oxidizing gas humidifying process of humidifying the oxidizing gas (the air) to be supplied;

3) an oxidizing gas backpressure increasing process of increasing back pressure of the oxidizing gas by adjusting the pressure regulator 46;

4) an anode stoichiometric ratio increasing process of increasing the supply amount of hydrogen so as to increase an anode stoichiometric ratio. The anode stoichiometric ratio herein denotes a ratio of the actual amount of hydrogen to a theoretical value of the required amount of hydrogen corresponding to the target output voltage of the fuel cell;

5) an anode stoichiometric ratio decreasing process of decreasing the supply amount of hydrogen so as to decrease the anode stoichiometric ratio;

6) a cooling water temperature decreasing process of decreasing the temperature of cooling water by, for example, actuating a radiator fan (not shown); and 7) a cooling water flow increasing process of increasing the flow rate of cooling water by, for example, actuating the cooling water pump 53.

A2. Water Content Estimation Process

Figure 3:
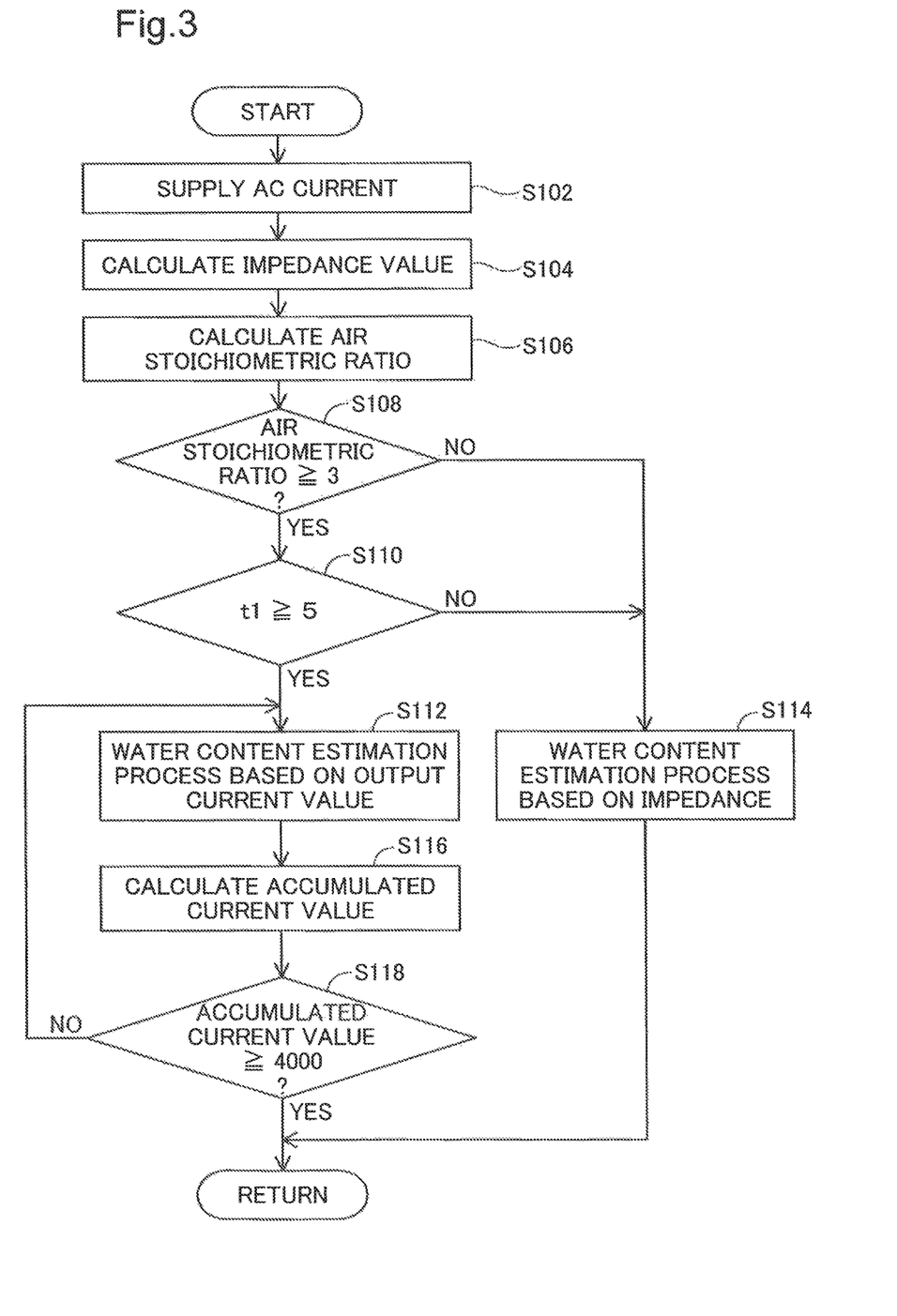
FIG. 3 is a flowchart showing a procedure of water content estimation process in the fuel cell system.

FIG. 3 is a flowchart showing a procedure of water content estimation process in the fuel cell system 100. The water content estimation process is started on a start of the fuel cell system 100 and is repeatedly performed until stop of the operation of the fuel cell system 100.

At step S102, the superimposed signal generator 62 generates the impedance measurement signal and outputs the generated impedance measurement signal to the voltage command signal generator 63. A DC current is accordingly supplied to the fuel cell 20 via the DC-DC converter 82.

At step S104, the impedance calculator 64 calculates the differential impedance of the fuel cell 20, based on the detection value of output voltage by the voltage sensor 74 and the detection value of output current by the current sensor 72 as described above.

At step S106, the water content estimator 65 obtains the target output voltage determined by the target voltage determiner 61, obtains the detection value of the amount of the intake air received from the air flowmeter 43, and calculates the air stoichiometric ratio. The air stoichiometric ratio of this embodiment corresponds to the oxidizing gas stoichiometric ratio in the claims.

At step S108, the water content estimator 65 determines whether the air stoichiometric ratio calculated at step S106 is equal to or greater than 3. When it is determined at step S108 that the air stoichiometric ratio ≥3, the water content estimator 65 proceeds to step S110. When it is determined at step S108 that the air stoichiometric ratio <3, on the other hand, the water content estimator 65 proceeds to step S114 to perform the water content estimation process based on the impedance. When it is determined at step S108 that the air stoichiometric ratio ≥3 for the first time after a start of the water content estimation process, the water content estimator 65 starts counting a first elapsed time t1. As described later, when it is determined again at step S108 that the air stoichiometric ratio ≥3 after end of counting the first elapsed time t1, the water content estimator 65 also starts counting the first elapsed time t1 (starts counting from t1=0). This embodiment shows an example in which the oxidizing gas stoichiometric ratio reference value in the claims is set to 3. In the fuel cell system 100 of the embodiment, the respective components are controlled to provide the air stoichiometric ratio=1.5 during ordinary operation. In other words, the oxidizing gas stoichiometric ratio reference value is greater than the air stoichiometric ratio during ordinary operation of the fuel cell system 100. The ordinary operation herein denotes an operation controlled to generate electric power at a target output voltage corresponding to the user's depression amount of the accelerator pedal (not shown) and more specifically an operation to respectively keep the air stoichiometric ratio and the anode stoichiometric ratio approximately constant at predetermined values (air stoichiometric ratio=1.5 and anode stoichiometric ratio=1.5 in this embodiment). The ordinary operation excludes an operation controlled irrespective of the depression amount of the accelerator pedal, such as a warm-up process or a purging process, and an operation to temporarily change the air stoichiometric ratio and the anode stoichiometric ratio from the predetermined values, such as quick acceleration or a sudden stop.

At step S110, the water content estimator 65 determines whether the first elapsed time t1≥5 [s]. When it is determined that the first elapsed time t1≥5 [s], the water content estimator 65 proceeds to step S112 to perform the water content estimation process based on the output current value. When it is determined that the first elapsed time t1<5 [s], on the other hand, the water content estimator 65 proceeds to step S114 to perform the water content estimation process based on the impedance. When it is determined at step S110 that the first elapsed time t1≥5 [s], the water content estimator 65 stops counting the first elapsed time t1 and starts counting a second elapsed time t2. The first elapsed time t1 corresponds to a time elapsed since satisfaction of the air stoichiometric ratio ≥3. The second elapsed time t2 corresponds to a time elapsed since the occurrence of localized drying of the electrolyte membrane. This embodiment uses continuation of the air stoichiometric ratio ≥3 for 5 seconds or longer (YES at steps S108 and S110) as a condition indicating that localized drying of the electrolyte membrane occurs. In other words, the conditions at steps S108 and S110 of this embodiment correspond to the first condition in the claims. The condition indicating that localized drying of the electrolyte membrane occurs means a condition that there is a high possibility that localized drying of the electrolyte membrane occurs. Satisfaction of this condition does not necessarily mean that localized drying of the electrolyte membrane actually occurs.

In the fuel cell system 100 of the embodiment, the respective components are controlled to provide the air stoichiometric ratio=1.5 during ordinary operation and to provide the air stoichiometric ratio ≥3 during the purging process. For example, the purging process is assumed as the occasion when localized drying of the electrolyte membrane occurs in the fuel cell 20. In the fuel cell system 100 of the embodiment, the purging process is performed when the ambient temperature is lower than a predetermined reference temperature on the stop of the fuel cell system 100. In this case, the purging process may be performed, for example, for 40 to 50 seconds at the air stoichiometric ratio of about 3 to 10. The purging process (drainage process) is performed when the user arbitrarily provides an instruction for drainage process, for example, by operation of a drainage process button. In this case, the purging process may be performed, for example, for about 15 seconds at the air stoichiometric ratio of about 3 to 10. During the purging process, the air stoichiometric ratio is higher than the air stoichiometric ratio during the ordinary process, and this higher air stoichiometric ratio continues for some time. Localized drying is thus likely to occur in the vicinity of an inlet of the oxidizing gas (the air). In the state other than the purging process, the user's sudden braking or quick acceleration may provide the air stoichiometric ratio ≥3. In this case, however, the air stoichiometric ratio ≥3 is only temporary and does not continue, so that it is unlikely to cause localized drying of the electrolyte membrane. In order to exclude such a temporary increase of the air stoichiometric ratio, the embodiment adds the condition of the elapsed time to the air stoichiometric ratio ≥3 as the condition indicating that localized drying of the electrolyte membrane occurs.

At step S112, the water content estimator 65 estimates the water content of the fuel cell 20, based on the output current value. The detailed processing of step S112 will be described later. The processing of step S112 of this embodiment corresponds to the first water content estimation process in the claims.

At step S116, the water content estimator 65 calculates an accumulated value of output current (hereinafter also referred to as "accumulated current value") for the second elapsed time t2. The accumulated current value is approximated by an integrated value for the elapsed time t2 calculated by multiplying the detection value of output current [A] by the current sensor 72 by the second elapsed time t2 [s]. At the time (first time) when the water content estimation process is changed over from the water content estimation process based on the impedance (step S114) to the water content estimation process based on the output current value (step S112), the accumulated current value is approximated by 0 at step S116.

At step S118, the water content estimator 65 determines whether the accumulated current value calculated at step S116 is equal to or higher than 4000 [A·s]. When it is determined that the accumulated current value≥4000, the water content estimator 65 returns to step S102. When it is determined that the accumulated current value<4000, on the other hand, the water content estimator 65 returns to step S112 to perform the water content estimation process based on the output current value. This embodiment uses the accumulated current value≥4000 as a condition indicating that localized drying of the electrolyte membrane is eliminated. Accordingly the processing of step S118 of this embodiment corresponds to the second condition in the claims. The condition indicating that localized drying of the electrolyte membrane is eliminated means a condition that there is a high possibility that localized drying of the electrolyte membrane is eliminated. Satisfaction of this condition does not necessarily mean that localized drying of the electrolyte membrane is actually eliminated. This embodiment shows an example in which the reference value of accumulated current value in the claims is set to 4000.

On the assumption of the purging process as the occasion when localized drying of the electrolyte membrane occurs in the fuel cell system 100, the embodiment operates the fuel cell system 100 under the similar conditions, experimentally determines in advance the accumulated current value that eliminates localized drying of the electrolyte membrane, and sets the reference value of accumulated current value. The reference value of accumulated current value is not limited to the value set in this embodiment but may be set appropriately according to the number of stacked unit cells and the type of fuel cell.

The procedure of this embodiment repeatedly performs calculation of the estimated value of water content based on the output current value (step S112) until it is determined at step S118 that the accumulated current value ≥4000 since the determination of the first elapsed time t1≥5 [s] at step S110. In other words, the procedure of this embodiment estimates the water content of the fuel cell 20 based on the output current value for a time period from the determination that there is a high possibility that localized drying of the electrolyte membrane occurs to the determination that there is a high possibility that localized drying of the electrolyte membrane is eliminated. A repetition cycle Δt of the processing of steps S112→S116→S118 is 16 [ms] according to this embodiment but may be set appropriately.

As described above, when it is determined at step S108 that the air stoichiometric ratio <3 or until 5 seconds have elapsed (No at step S110) since determination of the air stoichiometric ratio ≥3 (step S108), the water content estimator 65 performs the water content estimation process based on the impedance (step S114). Even when estimation of the water content based on the output current value is performed by the water content estimator 65 upon determination that there is a high possibility that localized drying of the electrolyte membrane occurs as described above, the water content estimator 65 performs the water content estimation process based on the impedance (step S114) upon determination that there is a high possibility that localized drying of the electrolyte membrane is eliminated. In other words, according to this embodiment, the water content estimator 65 changes over the estimation method of the water content of the fuel cell 20, based on the occurrence or non-occurrence of localized drying of the electrolyte membrane. The processing of step S114 will be described later.

A3. Estimation of Water Content Based on Impedance

The water content estimator 65 includes the impedance-water content map 652 as described above. The impedance-water content map 652 denotes a relationship between the differential impedance of the fuel cell 20 and the water content of the fuel cell 20. According to this embodiment, the amount of liquid water included in the electrolyte membrane, the electrode catalyst layers, the gas diffusion layers and the reactive gas flow paths in the separators is called water content of the fuel cell 20. When the water content of the fuel cell 20 is decreased, the electrode catalyst layer is dried prior to the electrolyte membrane. The decrease in the water content of the fuel cell 20 is thus reflected earlier on the electrode catalyst layer. As is known, the differential impedance is highly related to the water content in the electrode catalyst layer. Estimation of the water content of the fuel cell 20 based on the differential impedance thus allows for estimation of the water content of the fuel cell 20 with high accuracy. According to this embodiment, a relationship of the differential impedance to the water content of the fuel cell 20 is experimentally determined in advance and is stored in the form of the impedance-water content map 652. The impedance-water content map 652 may be provided as discrete values obtained by experiment or may be provided as continuous values of a mathematical expression indicating the relationship of the differential impedance to the water content of the fuel cell 20 based on the discrete values obtained by experiment. In the former configuration that provides as discrete values, the discrete values may be interpolated by linear interpolation.

The water content estimator 65 refers to the impedance-water content map 652, obtains an estimated value of water content of the fuel cell 20 based on the differential impedance calculated at step S104, and outputs the estimated value of water content to the water content controller 66.

A4. Estimation of Water Content Based on Output Current Value

Figure 4:
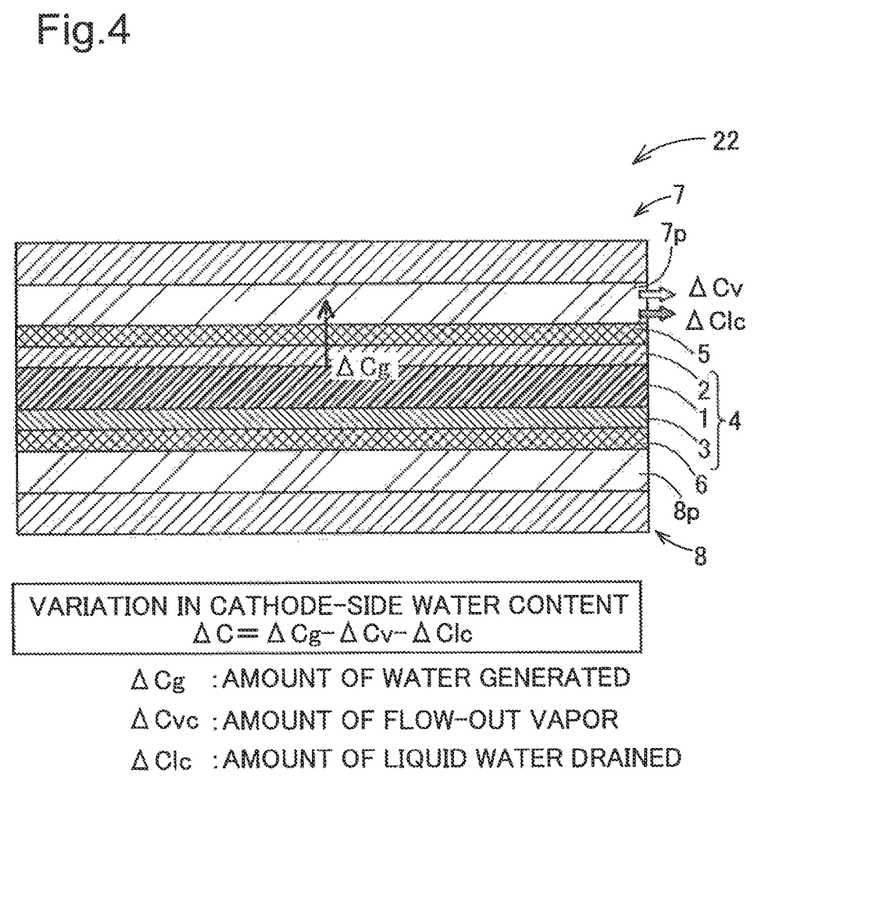
FIG. 4 is a diagram illustrating the outline of an estimation method of the water content based on the output current value.

FIG. 4 is a diagram illustrating the outline of the estimation method of the water content based on the output current value. FIG. 4 schematically illustrates the internal configuration of the unit cell 22. As described above, the unit cell 22 includes a membrane electrode assembly 4 having electrodes (cathode 2 and anode 3) provided on the respective sides of an electrolyte membrane 1. The membrane electrode assembly 4 is placed between a cathode separator 7 located on the cathode 2-side and an anode separator 8 located on the anode 3-side. Additionally, a gas diffusion layer 5 is provided between the membrane electrode assembly 4 and the cathode separator 7, and a gas diffusion layer 6 is provided between the membrane electrode assembly 4 and the anode separator 8.

Flow paths 7p and 8p which the reactive gases flow through are respectively formed on a surface of the separator 7 that is adjacent to the cathode 2 and a surface of the separator 8 that is adjacent to the anode 3. The flow paths 7p and 8p may be formed by concavities and convexities such as grooves, provided on the respective outer surfaces of the two separators 7 and 8. More specifically, the flow paths 7p and 8p may be provided by forming patterns in plate members as base members of the separators 7 and 8 by bending or pressing. The flow paths 7p and 8p may be provided by forming concaves on the surfaces of the plate members by pressing, cutting or etching. The flow paths 7p and 8p may be formed by separate members (for example, expanded metal or punched metal) placed on the respective surfaces of the two separators 7 and 8.

During operation of the fuel cell 20, the water content of the fuel cell 20 is varied mainly according to the amount of water generated by the power generation reaction of the fuel cell 20, the amount of water vapor discharged with the off gas and the amount of liquid water drained from the fuel cell 20.

The water content estimator 65 of the embodiment calculates a variation $\Delta C$ in the water content of the fuel cell 20 per unit time, multiplies the calculated variation $\Delta C$ by a cycle $\Delta t$ of repetition of the water content estimation process based on the output current value (16 [ms] in this embodiment), and adds the product to the water content calculated in a precious cycle, so as to provide the estimated value of water content of the fuel cell 20. The variation $\Delta C$ in the water content of the fuel cell 20 per unit time may be calculated by the following procedure.

The flow-in and flow-out amounts of water (including both water vapor and liquid water) flowing into and flowing out of the fuel cell 20 are significantly larger on the cathode 2-side than on the anode 3-side. The procedure of this embodiment accordingly neglects the flow-in and flow-out amounts of water on the anode 3-side of the fuel cell 20 and assumes that the variation $\Delta C$ in the water content of the fuel cell 20 is equal to a variation $\Delta Cc$ in the water content on the cathode 2-side of the fuel cell 20 ($\Delta C = \Delta Cc$)

The following parameters contribute to the variation $\Delta C$ in the water content of the fuel cell 20:

$\Delta Cg$ denotes the amount of water generated by the power generation reaction of the fuel cell 20 (amount of water generated);

$\Delta Cv$ denotes the amount of water vapor discharged with the off gas from the cathode 2 (amount of flow-out vapor); and $\Delta Clc$ denotes the amount of liquid water drained from the cathode 2 (amount of liquid water drained).

The variation $\Delta C$ in the water content of the fuel cell 20 is expressed by Equation (1) given below:

$$\Delta C = \Delta Cg - \Delta Cv - \Delta Clc \quad (1)$$

The amount of water generated $\Delta Cg$ [g/s] is determined by Equation (2) given below:

$$\text{Amount of water generated } \Delta Cg = I \times M_{H2O}/(F \times 2) \quad (2)$$

where I represents the electric current [A] output from the fuel cell 20 per unit time, $M_{H2O}$ represents the molecular weight of water [g/mol] and F represents Faraday constant [c/mol].

The amount of flow-out vapor $\Delta Cv$ [g/s] is determined by Equation (3) given below:

$$\text{Amount of flow-out vapor } \Delta Cv = Pvcout/(Pvout - Pvcout) \times Qcout/22.413 \times M_{H2O} \quad (3)$$

where Pvcout represents the saturated vapor pressure [kPa], Pvout represents the pressure of the cathode off-gas [kPa], and Qcout represents the flow rate of the cathode off-gas [L/s].

The saturated vapor pressure Pvcout is determined by Tetens's Equation given as Equation (4) below:

$$\text{Saturated vapor pressure } Pvcout = 6.11 \times 10^{\{7.5 \times T/(T+273.3)\}}/10 \quad (4)$$

where T represents the temperature of cooling water [° C.]. The detection value of the temperature sensor 52 is used as the temperature of cooling water T. The detection value of the pressure gauge 45 is used as the pressure Pvout of the cathode off-gas. The value calculated by subtracting an amount of oxygen consumed by power generation in the fuel cell 20 from the detection value of the air flowmeter 43 is used as the flow rate Qcout of the cathode off-gas. The amount of oxygen consumed by power generation is calculated from the detection value of the current sensor 72.

The amount of liquid water drained $\Delta Clc$ is determined according to the liquid water drainage map 654 that experimentally specifies the liquid water drainage characteristic relative to the flow rate of the oxidizing gas (the air). The liquid water drainage map 654 shows a relationship of the amount of liquid water drained $\Delta Clc$ to the estimated value of water content in a previous cycle of the water content estimation process based on the output current value and the flow rate of the oxidizing gas (the air) in the fuel cell 20 in a current cycle. More specifically, the liquid water drainage map 654 is expressed by Equations (5) and (6) given below:

$$y = (Clim - Cmax) \times b/(x - b) + Clim \quad (5)$$

$$y' = (Cmax - Clim) \times b/(x - b)^2 \quad (6)$$

where y represents the water content of the fuel cell 20, x represents a time period when the oxidizing gas (the air) flows, Cmax represents the full capacity of water content of the fuel cell 20, Clim represents the limit value of drainage, and b represents a constant defining the degree of change in y. Additionally, y' is an equation obtained by differentiating y with respect to x in Equation (5), denotes the slope of a tangent at a predetermined point on a hyperbolic curve expressed by Equation (5) and corresponds to a drainage rate at the water content and the flow rate of the oxidizing gas (the air) specified by the predetermined point. The amount of liquid water drained $\Delta Clc$ per unit time is equal to the drainage rate.

Figure 5:
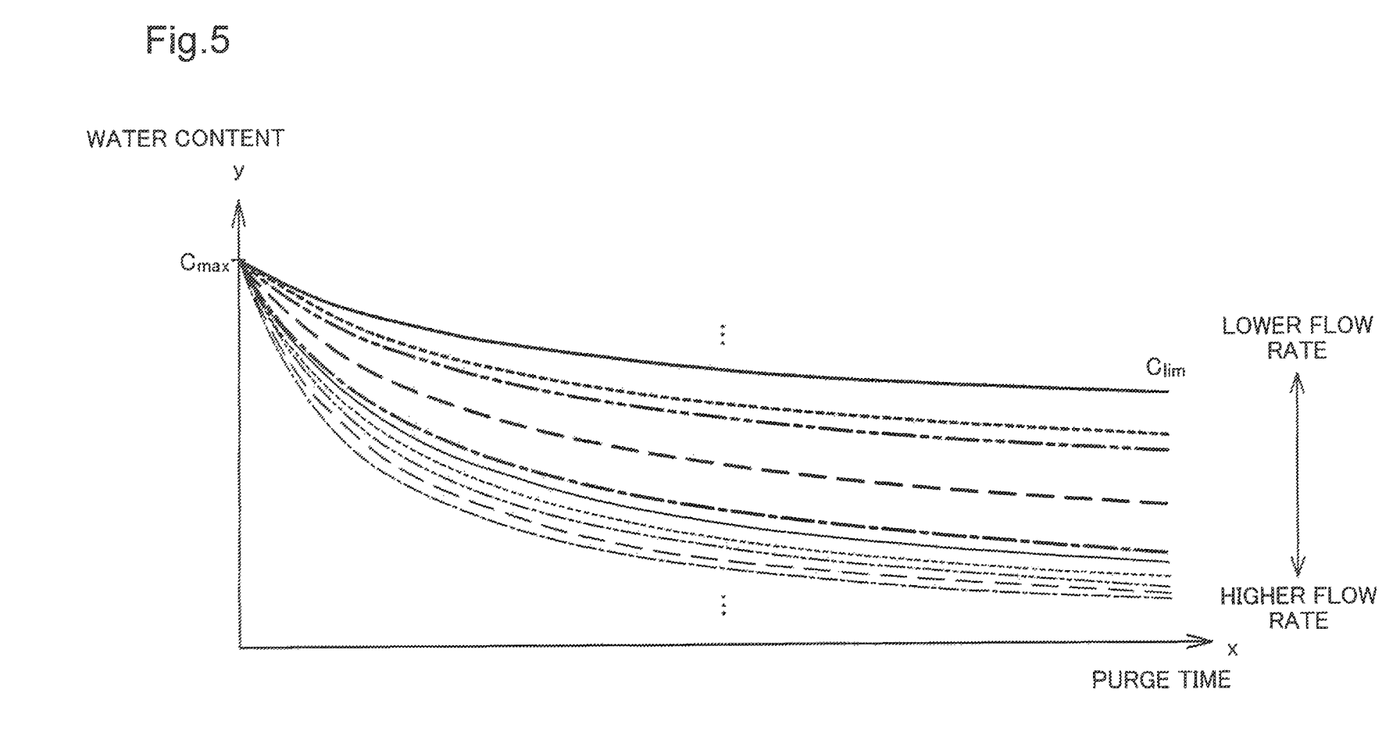
FIG. 5 is a diagram illustrating Equation (5) related to a liquid water drainage map.

FIG. 5 is a diagram illustrating Equation (5) related to the liquid water drainage map 654. FIG. 5 shows the relationships of the water content y of the fuel cell 20 to the time period x when the oxidizing gas (the air) flows, with respect to various flow rates of the oxidizing gas (the air). The graph of FIG. 5 is based on an experiment that causes a non-humidified purge gas (the air) to be flowed at a constant flow rate via a manifold of the fuel cell 20 into the fuel cell 20 that has the water content at the level of full capacity. Equation (5) is a mathematical expression of the hyperbolic curve shown in FIG. 5.

The full capacity of water content Cmax of the fuel cell 20 is determined according to the configuration of the fuel cell 20, for example, the spatial volumes of the flow paths 7p and 8p in the fuel cell 20 (shown in FIG. 4) and the maximum water content of the membrane electrode assembly 4. The limit value of drainage Clim denotes a limit value that is not allowed for any further reduction by the flow of the oxidizing gas (the air) and is determined according to the flow rate of the oxidizing gas (the air) (detection value by the air flowmeter 43 in the embodiment). In Equations (5) and (6), b represents a constant determined according to the flow rate of the oxidizing gas (the air).

The procedure of this embodiment determines the time period x by substituting the estimated value of water content in the previous cycle of the water content estimation process based on the output current value into y of Equation (5) given above and subsequently substitutes the value of x into Equation (6) given above to determine the drainage rate y' at the water content of the fuel cell 20 specified by the estimated value of water content in the previous cycle, i.e., the amount of liquid water drained ΔClc per unit time. At the time (first time) when the water content estimation process is changed over from the water content estimation process based on the impedance (step S114) to the water content estimation process based on the output current value (step S112), the estimated value provided by the water content estimation process based on the impedance is used as the estimated value of water content in the previous cycle.

The water content estimator 65 calculates the variation ΔC in the water content of the fuel cell 20 per unit time according to Equations (1) to (6) given above, multiplies the variation ΔC by the cycle Δt of the water content estimation process based on the output current value, adds the product to the estimated value of water content in the previous cycle to determine the water content of the current cycle (of the present moment), and outputs the determined water content of the current cycle to the water content controller 66. At the time (first time) when the water content estimation process is changed over from the water content estimation process based on the impedance (step S114) to the water content estimation process based on the output current value (step S112), the estimated value provided by the water content estimation process based on the impedance is used as the estimated value of water content in the previous cycle.

A5. Advantageous Effects of Embodiment

As is known, the water content of the fuel cell is related to the impedance of the fuel cell. In the case of estimating the water content of the fuel cell based on the impedance of the fuel cell, the water content is estimated based on a relationship between the impedance and the water content of the fuel cell that is experimentally specified in advance. This relationship is on the assumption of a homogeneous water content distribution in the electrolyte membrane. On the occurrence of localized drying of the electrolyte membrane, it is thus likely to provide a large error between the estimated value of water content and the actual value of water content. In the fuel cell system 100 of the embodiment, however, on satisfaction of the predetermined condition indicating that localized drying of the electrolyte membrane 1 occurs (i.e., continuation of the air stoichiometric ratio ≥3 for 5 seconds or longer), the water content of the fuel cell 20 is estimated based on the output current value of the fuel cell 20. The occurrence of localized drying of the electrolyte membrane reduces the power generation area in the unit cell 22 and accordingly decreases the output current value. Even on the occurrence of localized drying of the electrolyte membrane, estimation of the water content of the fuel cell 20 based on the output current value enables the water content of the fuel cell 20 to be estimated adequately. In the case of estimating the water content of the fuel cell 20 based on the output current value, on the other hand, the water content is estimated by calculating and summing up the values of the plurality of factors contributing to the variation ΔC in the water content. This also sums the errors of the respective factors. In the case of estimation of the water content based on the output current value for a long time period, accumulation of these errors is likely to increase the error between the estimated value and the actual amount of water content. The fuel cell system 100 of the embodiment, however, performs estimation of the water content based on the output current value when it is determined that there is a high possibility that localized drying of the electrolyte membrane occurs. The time period when estimation of the water content based on the output current value is performed is thus relatively short, and accumulation of errors is within an allowable range. As described above, the fuel cell system 100 of the embodiment changes over between estimation of the water content based on the impedance and estimation of the water content based on the output current value, based on the occurrence or non-occurrence of localized drying of the electrolyte membrane. This configuration enhances the accuracy in estimation of the water content of the fuel cell 20, irrespective of the degree of water content of the electrolyte membrane 1. This results in adequate control of the water content. In the case of determining termination of the purging process according to the water content of the fuel cell 20, this configuration allows for adequate control of the time of the purging process.

With regard to the relationship of the impedance of the fuel cell 20 to the water content of the fuel cell 20, in the case where the electrolyte membrane 1 of the fuel cell 20 is relatively dried as a whole (i.e., has a low water content), both the high frequency impedance and the differential impedance are well related to the water content of the fuel cell 20. In the case where the electrolyte membrane 1 has a relatively high water content, on the other hand, the high frequency impedance does not have the high accuracy of the relationship to the water content of the fuel cell 20, compared with the differential impedance. The fuel cell system 100 of the embodiment, however, estimates the water content based on the differential impedance. This configuration enables the water content of the fuel cell 20 to be estimated with high accuracy, irrespective of the degree of water content of the electrolyte membrane 1 (except localized drying), compared with estimation of the water content based on the high frequency impedance.

One available technique of estimating the water content of the fuel cell based on the impedance with high accuracy even on the occurrence of localized drying of the electrolyte membrane may divide the unit cell into a plurality of divisional areas and estimate the water content based on the impedance in each of the divisional areas. This technique can estimate the water content by taking into account the state of localized drying but needs sensors for measurement of impedance in the respective divisional areas. This results in complicating the design, increasing the total number of components and increasing the assembly time, thereby increasing the total cost. The fuel cell system 100 of the embodiment, on the other hand, can estimate the water content of the fuel cell 20 with high accuracy even on the occurrence of localized drying of the electrolyte membrane, without requiring additional sensors. This results in suppressing a cost increase and the like.

B. Second Embodiment

Figure 6:
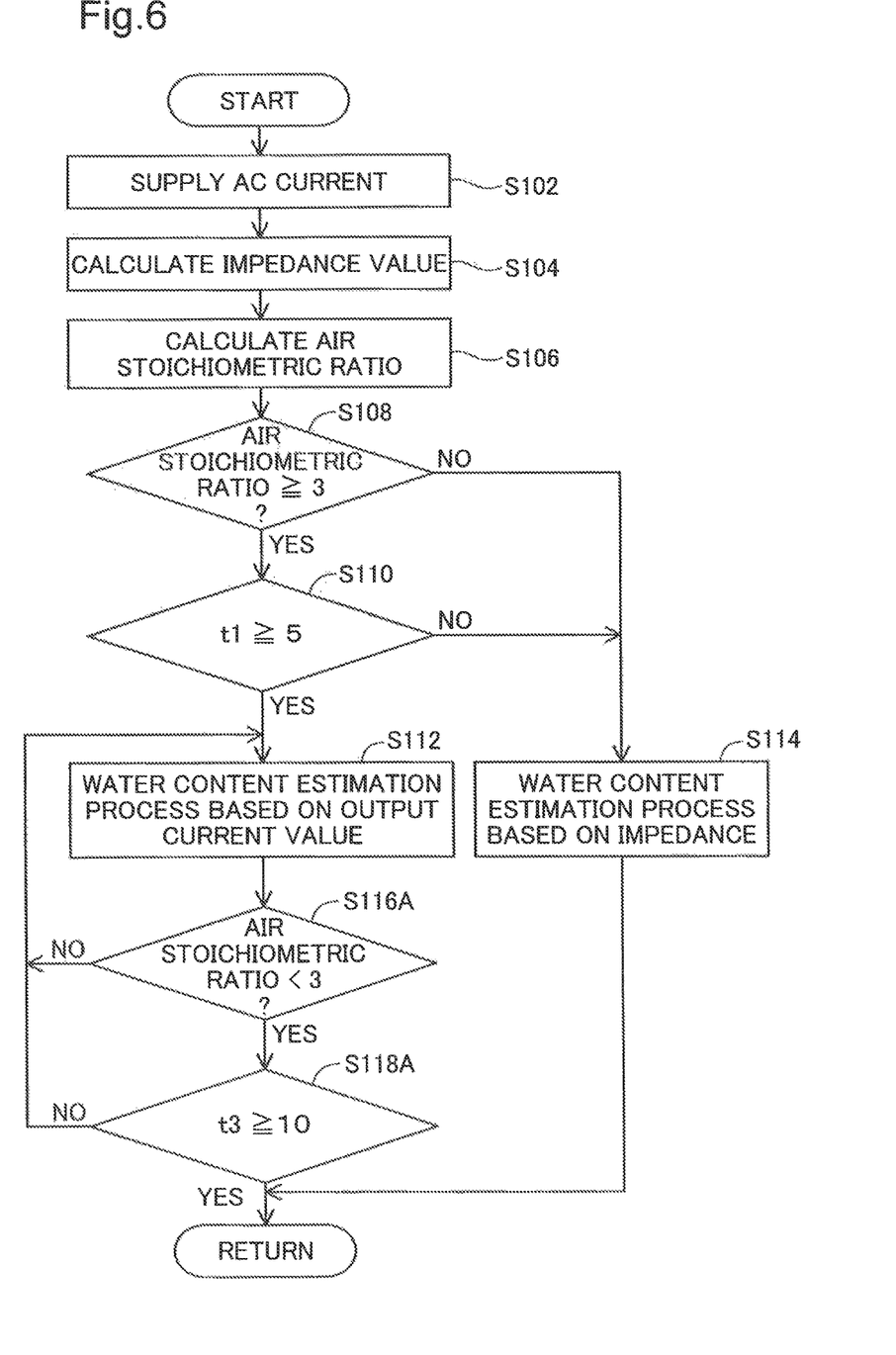
FIG. 6 is a flowchart showing a procedure of water content estimation process in a fuel cell system according to a second embodiment.

FIG. 6 is a flowchart showing a procedure of water content estimation process in a fuel cell system according to a second embodiment. The procedure of the second embodiment (shown in FIG. 6) performs steps S116A and S118A, in place of steps S116 and S118, after the processing of steps S102 to S112 described in the first embodiment (shown in FIG. 3). In other words, this embodiment differs from the first embodiment by the criterion for determining termination of the water content estimation process based on the output current value, i.e., for determining change-over to the water content estimation process based on the impedance.

At step S116A, the water content estimator 65 calculates the air stoichiometric ratio like step S106 and determines whether the air stoichiometric ratio <3. When it is determined that the air stoichiometric ratio <3, the water content estimator 65 proceeds to step S118A. When it is determined that the air stoichiometric ratio ≥3, on the other hand, the water content estimator 65 returns to step S112 to perform the water content estimation process based on the output current value. When it is determined that the air stoichiometric ratio <3 for the first time after the change-over of the water content estimation process from the water content estimation process based on the impedance (step S114) to the water content estimation process based on the output current value (step S112), the water content estimator 65 starts counting a third elapsed time t3.

At step S118A, the water content estimator 65 determines whether t3≥10 [s]. When it is determined that t3≥10 [s], the water content estimator 65 stops counting the third elapsed time t3 (resets t3=0) and returns to step S102. In other words, the water content estimator 65 terminates the water content estimation process based on the output current value. When it is determined that t3<10 [s], on the other hand, the water content estimator 65 returns to step S112 to perform the water content estimation process based on the output current value.

The second embodiment uses continuation of the air stoichiometric ratio <3 for 10 seconds or longer (YES at steps S116A and S118A) as the condition indicating that localized drying of the electrolyte membrane is eliminated. In other words, the conditions of steps S116A and S118A of this embodiment correspond to the second condition in the claims.

In the case where the air stoichiometric ratio <3 continues for 10 seconds or longer, there is a high possibility that localized drying of the electrolyte membrane 1 is eliminated. Like the fuel cell system 100 of the first embodiment, the fuel cell system of this embodiment performs the water content estimation process based on the impedance when there is a high possibility that localized drying of the electrolyte membrane 1 is eliminated. The configuration of the second embodiment estimates the water content by selecting the adequate estimation method of the water content based on the occurrence or non-occurrence of localized drying of the electrolyte membrane 1. This enhances the accuracy of estimation of the water content. The reference values used at steps S116A and S118A are values determined experimentally as the condition indicating that localized drying of the electrolyte membrane is eliminated and may be set appropriately according to, for example, the configuration of the fuel cell system 100.

C. Modifications

The invention is not limited to any of the embodiments and the examples described above but may be implemented by a diversity of other configurations without departing from the scope of the invention. For example, the technical features of any of the embodiments and examples corresponding to the technical features of each of the aspects described in Summary may be replaced or combined appropriately, in order to solve part or all of the problems described above or in order to achieve part or all of the advantageous effects described above. Any of the technical features may be omitted appropriately unless the technical feature is described as essential herein. Some examples of possible modifications are given below.

(1) According to the above embodiment, the water content estimator 65 estimates the water content of the fuel cell 20, based on the differential impedance of the fuel cell 20. According to a modification, the water content of the fuel cell 20 may be estimated, based on the high frequency impedance. Using the differential impedance, however, more effectively increases the accuracy of estimation of the water content.

(2) The estimation method of the water content based on the output current value is not limited to the above embodiment but may be any estimation method by taking into account at least the amount of water generated $\Delta Cg$. This is because the effects of the factors on the variation in the water content of the fuel cell 20 decrease in the sequence of the amount of water generated $\Delta Cg$, the amount of flow-out vapor $\Delta Cv$, the amount of liquid water drained $\Delta Clc$ and the amount of water migration $\Delta Ct$ from the cathode 2 to the anode 3. For example, the water content estimation process based on the output current value in the above embodiment may additionally take into account the amount of water migration $\Delta Ct$ or may additionally take into account flow-in and flow-out of water on the anode 3-side. For example, any of various methods described in JP No. 5482897 may be employed to estimate the water content of the fuel cell 20.

(3) The above embodiment illustrates the configuration of superimposing the impedance measurement signal on the target output voltage signal and supplying an AC current to the fuel cell 20. The configuration of measuring the impedance is, however, not limited to the above embodiment. For example, the configuration may include a separate impedance measurement unit that supplies an AC current to the fuel cell 20 to measure the impedance.

(4) The above embodiment uses continuation of the air stoichiometric ratio ≥3 for 5 seconds or longer as the condition indicating that localized drying of the electrolyte membrane 1 occurs (steps S108 and S110). These reference values are, however, not limited to those in the above embodiment but may be set appropriately according to, for example, the design of the fuel cell system 100. For example, the reference value of the air stoichiometric ratio (corresponding to the oxidizing gas stoichiometric ratio in the claims) may be set to 2.0, 2.5 or 3.5, and the continuation time (first elapsed time) may be set to 10 seconds or longer or 15 seconds or longer. Additionally, the reference value of the air stoichiometric ratio may be changed according to the temperature of the fuel cell 20. The electrolyte membrane 1 is likely to be dried at the high temperature of the fuel cell 20 (approximated by the temperature of cooling water). There is accordingly a likelihood that localized drying of the electrolyte membrane 1 occurs even at the low air stoichiometric ratio. The small value may thus be set to the reference value of the air stoichiometric ratio at the high temperature of the fuel cell 20. The electrolyte membrane 1 is unlikely to be dried, on the other hand, at the low temperature of the fuel cell 20. The larger value may thus be set to the reference value of the air stoichiometric ratio at the low temperature of the fuel cell 20. The configuration of chanting the reference value of the air stoichiometric ratio according to the temperature of the fuel cell 20 enhances the accuracy of determination of whether localized drying of the electrolyte membrane occurs or not, thus enhancing the accuracy of estimation of the water content.

(5) According to the above embodiment, the water content estimator 65 changes over the estimation method of the water content of the fuel cell 20 between the water content estimation process based on the impedance and the water content estimation process based on the output current value, based on the occurrence or non-occurrence of localized drying of the electrolyte membrane. A modification may employ an additional condition to change over the estimation method of the water content. For example, even on satisfaction of the condition indicating that localized drying of the electrolyte membrane is eliminated, in the case where an additional predetermined condition is satisfied, the modified procedure may not change over the estimation method to the water content estimation process based on the impedance but may continue the water content estimation process based on the output current value. In another example, even on satisfaction of the condition indicating that localized drying of the electrolyte membrane is eliminated, in the case where an additional predetermined condition is satisfied, the modified procedure may perform a third water content estimation process that is different from both the water content estimation process based on the impedance and the water content estimation process based on the output current value.

(6) At step S116 in the first embodiment described above, the accumulated current value is approximated by the product of the detection value of the output current [A] by the current sensor 72 and the second elapsed tie t2 [s]. According to a modification, the accumulated current value may be determined by summation of the product of the detected output current value and the cycle Δt of repetition of the water content estimation process based on the output current value with respect to the second elapsed time t2.

The invention claimed is:

1. A fuel cell system, comprising:
a fuel cell including an electrolyte membrane; and
a controller programmed to control the fuel cell and perform a first water content estimation process that estimates a water content of the fuel cell, based on a differential impedance or a high frequency impedance wherein the differential impedance is a difference between a low frequency impedance and the high frequency impedance of the fuel cell, wherein
until satisfaction of a second condition after satisfaction of a first condition, the controller is programmed to perform a second water content estimation process that estimates the water content of the fuel cell based on an output current value of the fuel cell, in place of the first water content estimation process wherein the second condition indicates that localized drying of the electrolyte membrane is eliminated and the first condition indicates that localized drying of the electrolyte membrane occurs, wherein
the first condition is that an oxidizing gas stoichiometric ratio is equal to or higher than an oxidizing gas stoichiometric ratio reference value that is greater than an oxidizing gas stoichiometric ratio during ordinary operation of the fuel cell system wherein the oxidizing gas stoichiometric ratio is a ratio of an actual supply amount of an oxidizing gas to a theoretically required supply amount of the oxidizing gas in the fuel cell system, and that a first elapsed time has elapsed since the oxidizing gas stoichiometric ratio becomes equal to or higher than the oxidizing gas stoichiometric ratio reference value, and
the second condition is that an accumulated current value by accumulation of the output current value of the fuel cell for a second elapsed time since satisfaction of the first condition is equal to or greater than a reference value of accumulated current value or that the oxidizing gas stoichiometric ratio is lower than the oxidizing gas stoichiometric ratio reference value and that a third elapsed time has elapsed since the oxidizing gas stoichiometric ratio becomes lower than the oxidizing gas stoichiometric ratio reference value.

2. The fuel cell system according to claim 1, wherein the controller is programmed to change the oxidizing gas stoichiometric ratio reference value based on temperature of the fuel cell.

* * * * *